Jan. 21, 1941.  J. PEZON  2,229,470
BAIT-CASTING REEL
Filed Nov. 30, 1938  2 Sheets-Sheet 1
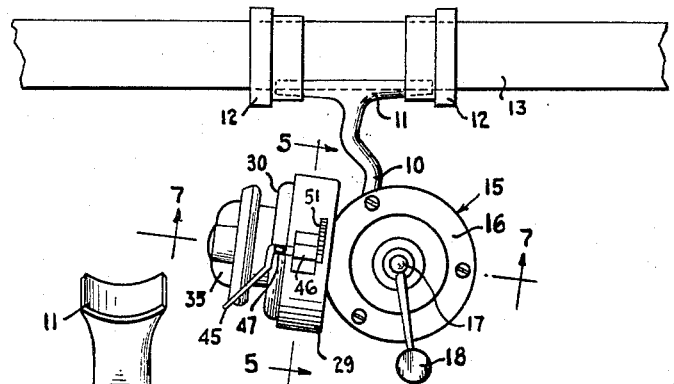
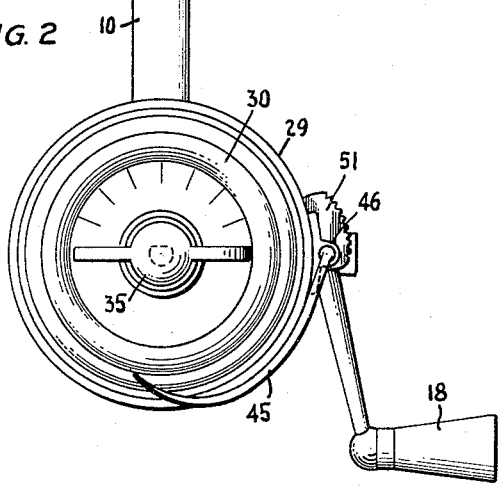
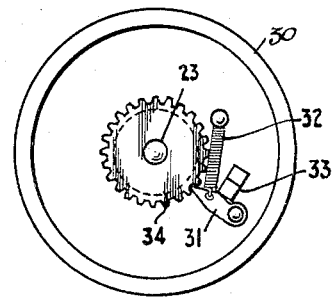
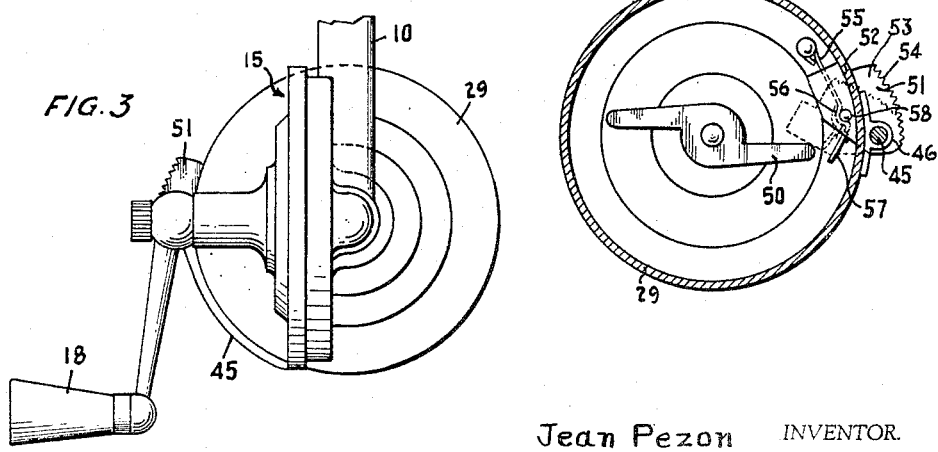
Jean Pezon  INVENTOR.
BY *[signature]*
ATTORNEY.

Jan. 21, 1941.     J. PEZON     2,229,470
BAIT-CASTING REEL
Filed Nov. 30, 1938     2 Sheets-Sheet 2
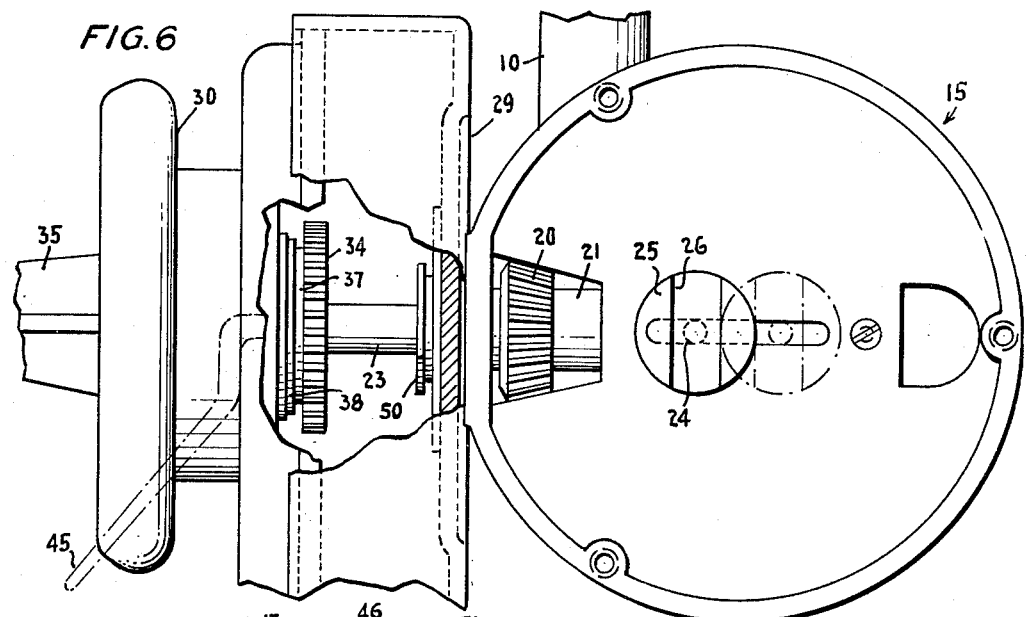
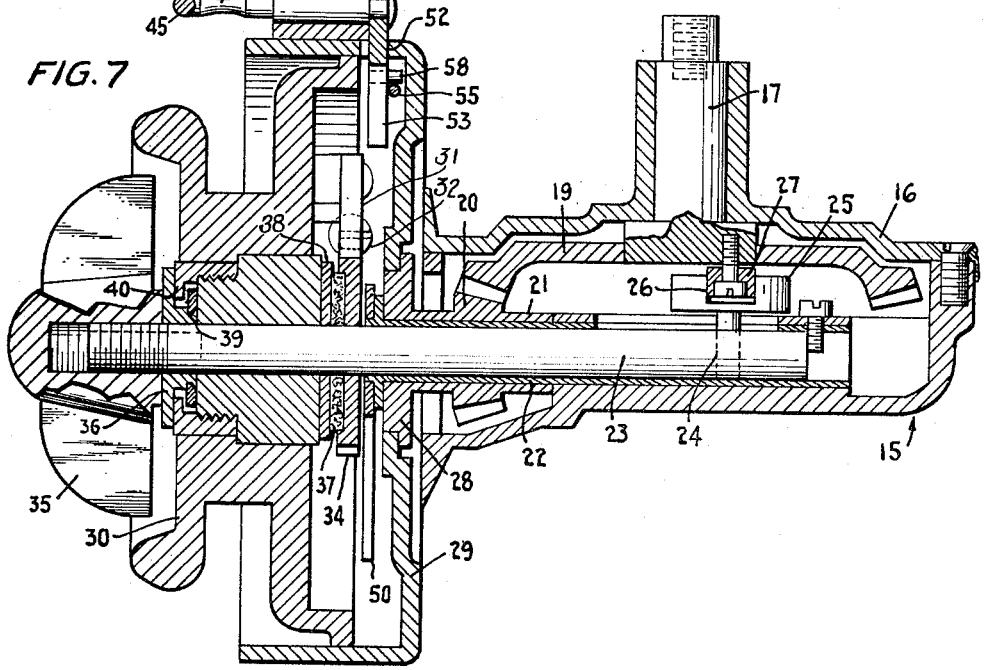
Jean Pezon INVENTOR.
BY
ATTORNEY.

Patented Jan. 21, 1941

2,229,470

UNITED STATES PATENT OFFICE 2,229,470

BAIT-CASTING REEL

Jean Pezon, Paris, France, assignor to Bache H. Brown, New York, N. Y.

Application November 30, 1938, Serial No. 243,060

9 Claims. (Cl. 242—84.4)

The invention relates to a casting reel such as is used in angling, and more especially to that type of reel wherein provision is made for imparting a traverse motion to the line drum or spool and for setting a loop or like pick-up member designed for engagement with or positioning out of contact with the said line.

It has for an object the provision of novel means for effecting the traverse of the drum or spool for the line and also of means for checking rotation of the spool and to confine it to one direction of rotation, as well as to means for providing an adjustable braking action or drag on said spool.

Another object of the invention is to provide a novel form of pick-up for the line, together with means whereby the same may conveniently be positioned manually outside the path of the outgoing line and to be restored automatically for reeling in the line.

In carrying out the invention, the novel reel is supported through an attaching bracket by means of which it may be secured to a rod, said bracket carrying a housing for the driving mechanism. The latter may include a pair of bevel gears, one of which is attached to a shaft extending laterally through the housing and carrying a crank handle for rotating the one wheel of the pair. The other wheel is mounted to rotate about a reciprocable spindle and carries a rotatable, cup-shaped member or flier which rotates therewith. The said spindle is reciprocated by means of an eccentrically disposed pin rotating with the rotating gear wheel and fitting a transverse groove of a head extending laterally from said spindle.

The spindle extends axially through the flier and projects beyond the same, and at its outer end it supports for rotation in one direction only the spool or drum upon which the line is wound, provision being made, as through a ratchet and pawl member, to check rotation of the spool. By means of a floating washer mounted loosely upon the said spool and a nut adjustably mounted over the protruding end of the spindle for exerting pressure on the washer, an adjustable drag is provided upon the said spool.

In casting, the line is designed to be fed freely off the spool without rotating the same; and in recovering the line, this is accomplished in the rotation of the flier through engagement of the line by a wire loop or like member carried at its periphery and designed to be snapped into position over the spool to pick up said line. The loop to this end is pivoted in a bearing of the flier, there being a spring-pressed arm extending inwardly of the flier for engagement, when properly set, with fixed oppositely extending arms located within the flier upon a spindle sleeve. As the crank handle is therefore turned and carries the flier therewith, the said loop, if not in position for engaging the line, will be snapped into the required position to pick up the line upon further rotation of the flier. Provision is made, also, for returning the loop to a non-engaging position, as by means of a knurled fingerpiece projecting exteriorly of the flier and integral or connected with the throw-off or engaging means.

The nature of the invention, however, will best be understood when described in connection with the accompanying drawings, in which:

Fig. 1 is a view of the novel reel showing the same attached to a rod.

Fig. 2 is an enlarged plan view of the reel.

Fig. 3 is a similar underneath view of the reel.

Fig. 4 is an underneath view of the spool, together with an associated ratchet wheel.

Fig. 5 is a horizontal section through the flier portion and taken on the line 5—5, Fig. 1 of the drawings, looking in the direction of the arrows.

Fig. 6 is a fragmentary detail elevation with portion of the flier removed as well as the cover plate for the driving mechanism casing.

Fig. 7 is an enlarged longitudinal section through the reel and taken on the line 7—7, Fig. 1 of the drawings, looking in the direction of the arrows.

Referring to the drawings, 10 designates a suitable bracket having the curved attachment portion 11 with beveled ends adapted to fit under suitable slides or sleeves 12 for mounting the bracket and reel carried thereby to a rod 13 in the usual manner. Bracket 10 carries the entire mechanism as through a housing 15 provided with removable cover 16, this housing being designed to retain suitable driving mechanism. Thus, a shaft 17 which extends laterally through the cover of the housing is designed to receive a crank handle or the like 18 for manually rotating the said shaft. On the shaft is mounted a bevel gear wheel 19 meshing with a further bevel gear wheel 20 secured to or integral with a sleeve 21 whereby rotation is imparted to the said sleeve when the crank handle is turned.

Within the bevel wheel 20 and its sleeve is mounted a further sleeve 22 about a reciprocable and longitudinally disposed spindle 23. This spindle is designed for reciprocation axially relatively to the housing; and to this end the spindle carries a laterally extending pin 24 having a head 25 at its outer end and designed for movement within the housing. The head to this end is provided with the transverse slot 26 in which is designed to move a pin or roller 27 eccentrically carried by the bevel gear wheel 19 so that, when said wheel is rotated, spindle 23 will be correspondingly reciprocated.

Carried by the gear wheel 20 or rather an extension flange 28 thereof, is a cup-shaped member or flier element 29 which is designed to rotate with said gear wheel 20 about the sleeve 22, the said spindle projecting beyond the top of the flier and being designed to receive at its outer end a spool or drum member 30 upon which the line is carried. The flier carries also, upon its periphery, a pick-up element or loop member hereinafter more fully described.

Provision is made for so mounting the spool upon the spindle that it may rotate in one direction only about said spindle as an axle. To this end, there is provided on the under side of the spool (see Fig. 4 of the drawings) a pawl 31 and a spring 32 drawing said pawl against a stop 33 also fixed to the under side of said spool. The pawl 31 is designed to engage a ratchet wheel 34 fixed to the said spindle 23, as by a pressed fit thereon; and in view of the abutment or stop 33, the pawl 31 may yield in only one direction so that rotation may be imparted to said spool in a predetermined direction only and which, as will hereinafter be more fully set forth, is the direction of rotation of the flier for winding the line on the spool through the action of its attached loop or pick-up member.

The spool 30 is free to rotate, in the predetermined direction, upon spindle 23 and may also conveniently be removed, as for substitution of a line, by unscrewing a wing nut 35 mounted over the outer threaded end of the spindle. This nut is designed to bear upon a floating washer 36, carried by the spool in its upper surface and adapted to be keyed to the spindle, and whereby pressure may be exerted upon the spool whose under side rests upon the ratchet wheel 34, or rather upon intermediate resilient and metallic washers 37 and 38, respectively. By preventing relative rotation of the washer 36 with respect to the spindle, there will be no tendency to turn accidentally the said nut 35 and thereby change the drag effect unintentionally.

By this expedient, a drag upon a retardation of the rotation of the spool is provided for and which may readily and quickly be adjusted to the desired degree by unscrewing or taking up upon the nut 35 as the ocasion may require. Washer 36 is arranged to be freely rotatable in the upper surface of the spool, as by having portions 39 turned under a cap 40 imbedded in the spool which is preferably constructed of moldable material or other suitable composition; and when the spool is mounted on the spindle, washer 36 will be retained against rotation but will allow the said spool to move freely with respect thereto, except as to the drag applied by nut 35.

In casting with a reel of this nature, the line on the spool is payed out freely without rotation of the spool itself which occurs only when a decided pull is exerted on the line after engagement of a loop or pick-up member therewith. The drawing out of the line is then checked by the pawl and ratchet engagement aforesaid, as well as by the drag exerted by wing nut 35 upon the spool and which is readily variable as hereinbefore set forth.

To recover the line and rewind the same upon the spool, provision is made for a pick-up member carried by and rotatable with the flier 29. This pick-up member comprises essentially a wire loop or pick-up portion 45 which is pivotally mounted in the bearing 46 attached to the periphery of the flier, the loop being adapted to extend, when positioned as hereinatfer set forth, into the path of the outgoing line. When the flier is then rotated in the direction of rotation of the spool, it will pick up and, preferably through engagement with a rotatable bearing portion 47 as of agate or like material, will wind the line on the spool so long as the latter is stationary or rotates at a lesser angular velocity. The spool at the same time reciprocates in order that the line may be uniformly distributed thereover for proper casting of the line when this is again to be effected.

In order to locate the pick-up member for thus winding the line upon its spool, provision is made for engagement of the same with one or more fixed arms 50 secured to the sleeve 22, these arms, as shown, being diametrically opposed so that the pick-up may be accomplished within substantially half a revolution of the flier. The engagement with the pick-up member is accomplished through an extension thereof, as the plate 51, which is turned inwardly substantially at right angles to the bearing shank of the wire loop below the bearing to pass through a slot 52 in the flier wall. A portion 53 of this plate projects also externally of the flier wall and is knurled or otherwise roughened along its edge as at 54 to afford a finger grip whereby the pick-up member may be manually shifted to a position out of line engagement. The line engagement position is effected automatically by contact of the inner portion of plate 51 with one or the other of the arms 50 as the flier is rotated.

To insure these two positions, a spring snap action is provided for through a spring 55 which is fixed to the flier within the same and has the two holding surfaces 56 and 57 corresponding to the two predetermined positions of the pick-up member and adapted for engagement with a pin 58 extending from the plate into the path of the said spring. The position indicated in the full lines, Fig. 5 of the drawings, is that wherein the pick-up member is in line-engaging position, whereas the position indicated by the dotted lines is that wherein the pick-up member is located out of engagement with the line.

I claim:

1. A casting reel, comprising a rod-attaching bracket, a casing carried by the bracket, and driving means therein, a reciprocable spindle extending longitudinally of the casing and beyond the same and adapted for reciprocation by the driving means, a flier rotatably mounted on the spindle and rotated by said driving means, a line-carrying spool rotatably mounted on the projecting end of the spindle and means to confine its rotation to one direction, and a line-engaging element mounted on the flier and comprising a wire pick-up loop pivoted to the periphery of the flier and having a manually-engageable portion turned substantially at right angles thereto beyond the pivotal point and having an extension into the flier, a spring element carried by the flier for engagement with a pin extending from said extension to hold the loop in position for engaging the line and out of engaging location, and fixed trigger means adapted to engage the extension when the flier is rotated in the direction of rotation of the spool to restore the line-engaging element to its line-engaging position.

2. A casting reel, comprising a rod-attaching bracket, a casing carried by the bracket, and driving means therein, a reciprocable spindle extending longitudinally of the casing and beyond the same and adapted for reciprocation by the driving means, a flier rotatably mounted on the spindle and rotated by said driving means, a line-carrying spool rotatably mounted on the projecting end of the spindle and means to confine its rotation to one direction, and a line-engaging element mounted on the flier and comprising a wire pick-up loop pivoted to the periphery of the flier and carrying a rotatable bearing element, said loop having a manually-engageable portion turned substantially at right angles thereto beyond the pivotal point and having an extension into the flier, a spring element carried by the flier for engagement with a pin extending from said extension to hold the loop in position for engaging the line and out of engaging location, and fixed trigger means adapted to engage the extension when the flier is rotated in the direction of rotation of the spool to restore the line-engaging element to its line-engaging position.

3. A casting reel, comprising a rod-attaching bracket, a casing carried by the bracket, and driving means therein, a reciprocable spindle extending longitudinally of the casing and beyond the same and adapted for reciprocation by the driving means, a flier rotatably mounted on the spindle and rotated by said driving means, a line-carrying spool rotatably mounted on the projecting end of the spindle and means to confine its rotation to one direction, a floating washer permanently retained and freely rotatable in the spool and keyed to the spindle, and a nut screwed upon the outer end of the spindle for engaging the washer to provide an adjustable and unchanging drag upon the rotation of said spool upon the spindle, and a line-engaging element mounted on the flier, together with manually-actuated means associated with said element for positioning the same out of engaging location with the outgoing line, and means for automatically positioning said element for engaging the line upon rotation of the flier in the direction of rotation of the spool.

4. A casting reel, comprising a rod-attaching bracket, a casing carried by the bracket, and driving means therein, a reciprocable spindle extending longitudinally of the casing and beyond the same and adapted for reciprocation by the driving means, a flier rotatably mounted on the spindle and rotated by said driving means, a line-carrying spool rotatably mounted on the projecting end of the spindle and means to confine its rotation to one direction, a floating washer permanently retained and freely rotatable in the spool and keyed to the spindle, and means exerting a yielding pressure upon said washer, and a nut screwed upon the outer end of the spindle for engaging the washer to provide an adjustable and unchanging drag upon the rotation of said spool upon the spindle, and a line-engaging element mounted on the flier, together with manually-actuated means associated with said element for positioning the same out of engaging location with the outgoing line, and means for autmatically positioning said element for engaging the line upon rotation of the flier in the direction of rotation of the spool.

5. In a casting reel including a line-carrying spool and an associated rotatable flier, together with means to rotate said flier; a line-engaging element pivoted to the periphery of the flier and comprising a wire pick-up loop having a free outer end to engage the line and terminating at the other end in an integral finger piece projecting externally of the flier for moving the loop out of line-engaging position, said finger-piece having an extension within the flier, and fixed means within the flier adapted for engagement with the said extension for restoring automatically the said loop to line-engaging position upon rotation of the flier.

6. A casting reel, comprising a rod-attaching bracket, a casing carried by the bracket, and driving means therein, a reciprocable spindle extending longitudinally of the casing and beyond the same and adapted for reciprocation by the driving means, a flier rotatably mounted on the spindle and rotated by said driving means, a line-carrying spool rotatably mounted on the projecting end of the spindle and means to confine its rotation to one direction, and a line-engaging element pivotally mounted on the flier including a pick-up loop portion with free outer end to engage the line, said element terminating at the other end in an integral finger-piece projecting externally of the flier for moving the line-engaging element away from the spool, and a pair of fixed arms extending in diametrically opposite directions from the spindle for engaging an inward extension of the finger-piece to restore the pick-up loop portion of said line-engaging element to a position over the spool for engaging the line thereof when the flier is rotated in the direction of rotation of the said spool.

7. In a casting reel: a line-carrying spool adapted for rotation on a spindle of the reel and for movement axially thereof, together with a floating washer permanently retained and freely rotatable in the upper face of the spool and adapted for keying to the spindle.

8. In a casting reel: a line-carrying spool adapted for rotation on a spindle of the reel and for movement axially thereof, together with a floating washer permanently retained and freely rotatable in the upper face of the spool and adapted for keying to the spindle, and adjustable means engaging the washer and cooperating therewith to provide various degrees of drag upon the spool.

9. A casting reel, comprising a casing, and driving means therein, a reciprocable spindle extending longitudinally of the casing and beyond the same and adapted for reciprocation by the driving means, a flier rotatably mounted on the spindle and rotated by said driving means, a line-carrying spool rotatably mounted on the projecting end of the spindle and means to confine its rotation to one direction, means to provide an adjustable and unchanging drag on the spool upon its rotation on the spindle including a floating washer permanently retained and freely rotatable in the spool and keyed to said spindle, together with means exerting a yielding pressure upon said washer and including a nut screwed upon the outer end of the spindle, and a line-engaging element mounted on the flier, together with manually-actuated means associated with said element for positioning the same out of engaging location with the outgoing line, and means for automatically positioning said element for engaging the line upon rotation of the flier in the direction of rotation of the spool.

JEAN PEZON.